(12) United States Patent
Klein et al.

(10) Patent No.: US 12,210,495 B2
(45) Date of Patent: Jan. 28, 2025

(54) DATA QUALITY MANAGEMENT SYSTEM

(71) Applicant: ADP, INC., Roseland, NJ (US)

(72) Inventors: Eitan Klein, New York, NY (US); Mohammed Ahmed, New York, NY (US); Jonathan Baier, New York, NY (US)

(73) Assignee: ADP, Inc., Roseland, NJ (US)

( * ) Notice: Subject to any disclaimer, the term of this patent is extended or adjusted under 35 U.S.C. 154(b) by 189 days.

(21) Appl. No.: 17/302,972

(22) Filed: May 17, 2021

(65) Prior Publication Data
US 2022/0365912 A1  Nov. 17, 2022

(51) Int. Cl.
*G06F 16/215* (2019.01)
*G06F 16/28* (2019.01)
*G06N 20/00* (2019.01)

(52) U.S. Cl.
CPC .......... *G06F 16/215* (2019.01); *G06F 16/285* (2019.01); *G06N 20/00* (2019.01)

(58) Field of Classification Search
CPC ...... G06F 16/215; G06F 16/285; G06N 20/00
See application file for complete search history.

(56) References Cited

U.S. PATENT DOCUMENTS

| | | | |
|---|---|---|---|
| 2010/0241416 A1* | 9/2010 | Jiang | G06F 40/40 704/7 |
| 2018/0113898 A1* | 4/2018 | Hall | G06F 16/215 |
| 2020/0233862 A1* | 7/2020 | Shaked | G06F 18/24 |
| 2021/0117436 A1* | 4/2021 | Zabel | G06F 16/258 |
| 2021/0194924 A1* | 6/2021 | Heinemeyer | H04L 51/212 |
| 2021/0232908 A1 | 7/2021 | Xian et al. | |
| 2022/0300557 A1* | 9/2022 | Basu | G06F 16/9027 |

* cited by examiner

*Primary Examiner* — Sherief Badawi
*Assistant Examiner* — Earl Elias
(74) *Attorney, Agent, or Firm* — Foley & Lardner LLP

(57) ABSTRACT

A computer-implemented method for managing data quality is provided. The method comprising determining, by a rule engine, a number of critical data points in a number of different software modules. A classifier is identified based on a data type of the critical data points, and the classifier is bound to the critical data points. The classifier scans the critical data points for anomaly to verify an ability to correctly process the critical data points. A data quality report is generated based on the scan and displayed to an end user in a graphical user interface.

24 Claims, 4 Drawing Sheets

DATA QUALITY MANAGEMENT SYSTEM

BACKGROUND INFORMATION

1. Field

The present disclosure relates generally to an improved computer system and, in particular, to a method and system for managing data quality across multiple domains.

2. Background

Data quality refers to the state of qualitative or quantitative pieces of information. Data quality measures the condition of data based on factors such as accuracy, completeness, consistency, reliability, and whether the data is up to date. Data is generally considered high quality if it correctly represents the real-world construct to which it refers and is intended to be used in operations, decision making, planning, and compliance to an application data model and storage format, e.g., all data is accurate and there are no missing connections between tables. Data quality is a concern for information systems including, e.g., data warehousing, business intelligence, custom relationship management, and supply chain management. As the number of data sources increases, internal data consistency becomes more difficult to maintain.

The emphasis on data quality in company systems has increased as data processing has become increasingly linked with business operations and the use of data analytics to help with business decisions. Poor-quality data can be a source of operational errors, resulting in economic damage, as well liability/credibility issues.

Therefore, it would be desirable to have a method and apparatus that take into account at least some of the issues discussed above, as well as other possible issues.

SUMMARY

An illustrative embodiment provides a computer-implemented method for managing data quality. The method comprising determining, by a rule engine, a number of critical data points in a number of different software modules. A classifier is identified based on a data type of the critical data points, and the classifier is bound to the critical data points. The classifier scans the critical data points for anomaly. A data quality report is generated based on the scan and displayed to an end user in a graphical user interface.

Another illustrative embodiment provides a system for managing data quality. The system comprises a storage device configured to store program instructions and one or more processors operably connected to the storage device and configured to execute the program instructions to cause the system to: determine, by a rule engine, a number of critical data points in a number of different software modules; identify a classifier based on a data type of the critical data points; bind the classifier to the critical data points; scan, with the classifier, the critical data points for anomality; generate a data quality report based on the scan; and display the data quality report to an end user in a graphical user interface.

Another illustrative embodiment provides a computer program product for managing data quality. The computer program product comprises a computer-readable storage medium having program instructions embodied thereon to perform the steps of: determining, by a rule engine, a number of critical data points in a number of different software modules; identifying a classifier based on a data type of the critical data points; binding the classifier to the critical data points; scanning, with the classifier, the critical data points for anomaly; generating a data quality report based on the scanning; and displaying the data quality report to an end user in a graphical user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that data quality is a concern for a range of information systems including data warehousing, business intelligence, custom relationship management, and supply chain management.

The illustrative embodiments also recognize and take into account that as the number of data sources increases, internal data consistency becomes more difficult to maintain. The longer an organization operates, data quality may decay due to life events, reliability issues, and missing data. Such decay might result in, e.g., negative impact on customers (e.g., invalid W2 tax forms, invalid permission due to an invalid approval chain), higher production costs from multiple processing rounds, lower return on investment from data mining due to processing "stale" data, and products and platforms to reduce repeatable mistakes.

The illustrative embodiments recognize and take into account that an organization might have multiple methods to validate inputs. The know how might exist at different levels, e.g., code, metadata, programmer experience, etc. However, there is no central definition. As a result, multiple teams may pay a high cost in terms of time and resources and can repeat others' mistakes as they need to recreate a knowledge base.

The illustrative embodiments provide domain specific classifiers (as adapters) with the ability to pre-validate critical data points to ensure high quality output. In some embodiments, the classifiers may be specific to knowledge or service domains (e.g., human resources (HR) domains such as payroll, benefits, etc.). A classifier can validate the health of a reporting structure by performing tree traversal and ensure connectivity between resources from top to bottom. A base layer of domain specific rules performs static data analysis on input and predicts the ability to correctly produce a desired output by running data validation as a preparation task. The classifiers might also be executed as post validation (e.g., checkboxes in a W2 form match the inputs). The classifiers may comprise pluggable components to similar patterns of data. For example, when a narrow data distribution is expected, a histogram classifier may be bonded to the critic data points.

The illustrative embodiments provide a customizable tool for automating data management that can be used with any system. A data management request targeting particular object is received by a request server that communicate with a database server. The database server contains all information relates to the objects and relationship between different components of the system. The request server identifies an appropriate application based on information stored in database server and sends an output to the identified application to manage the objects within the identified application.

Figure 1:
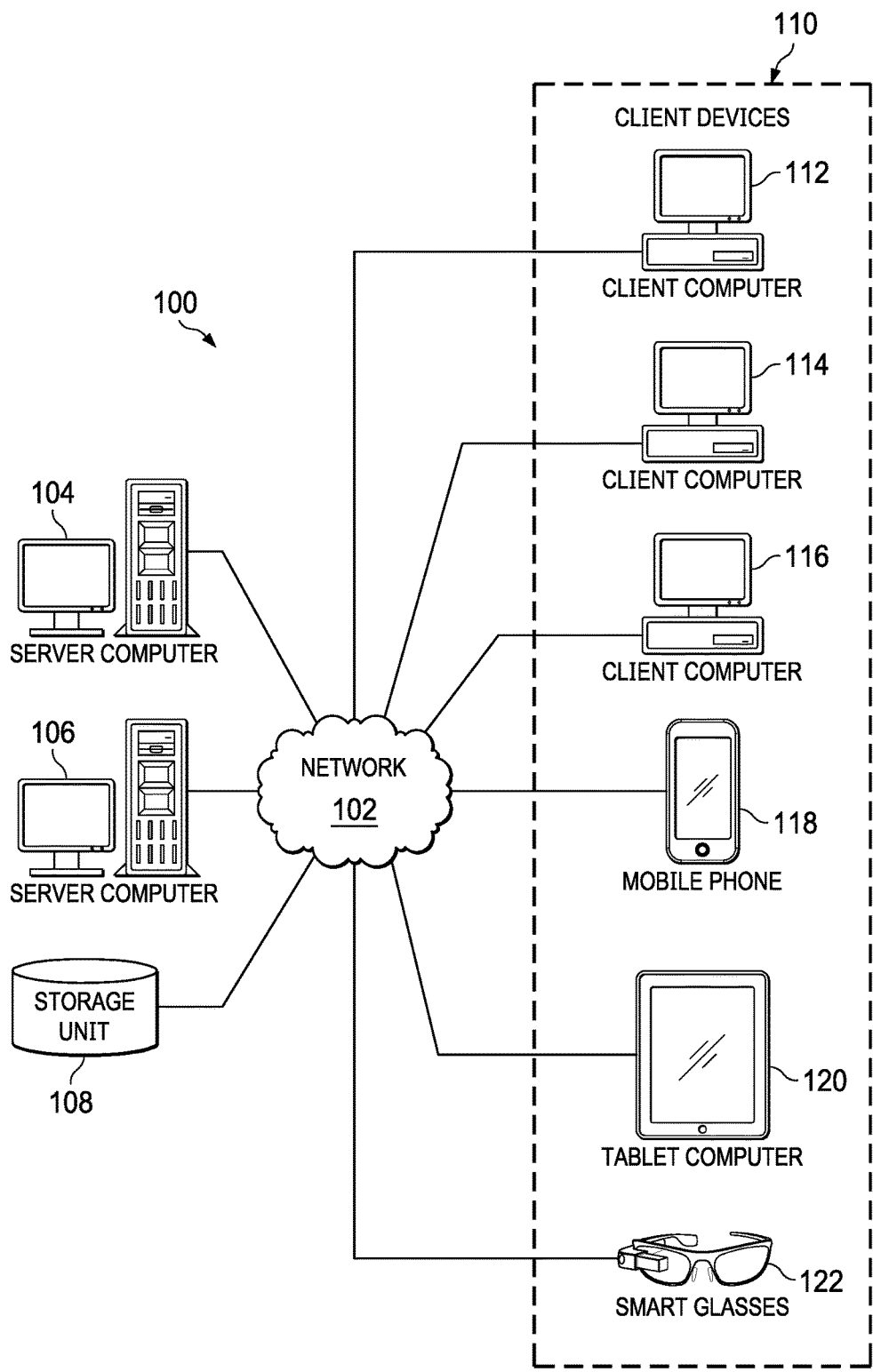
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
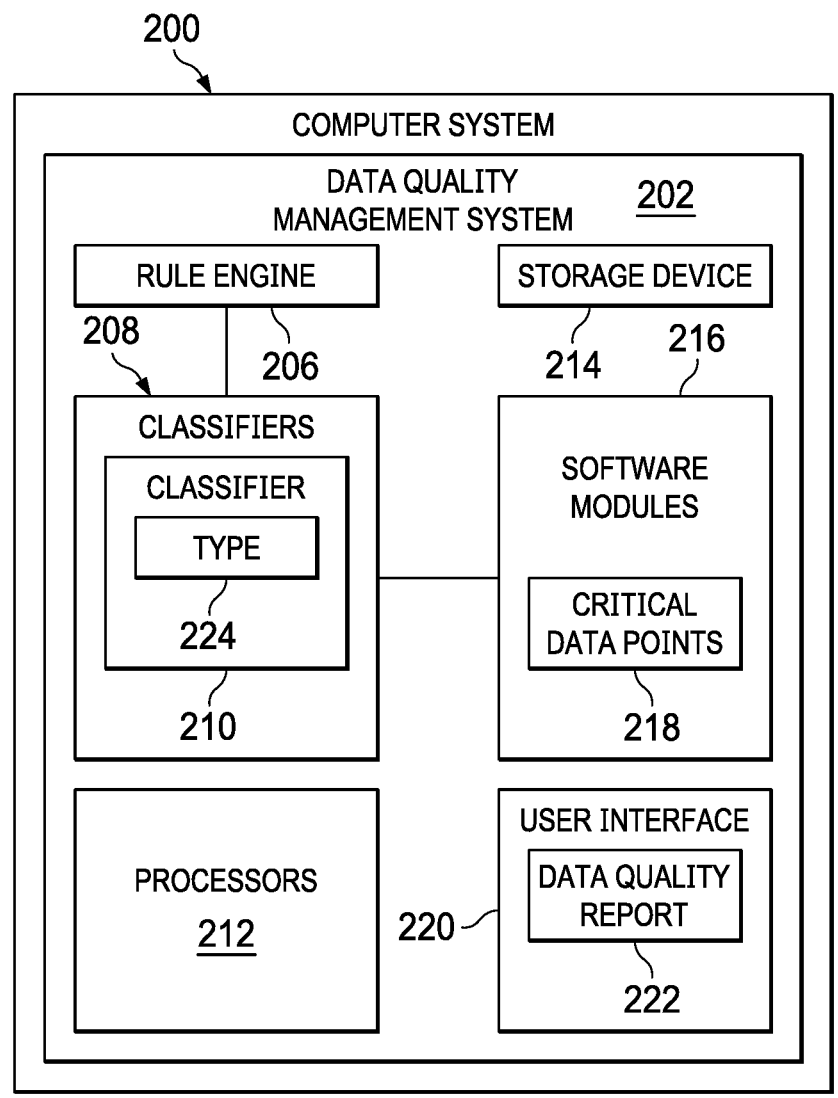
FIG. 2 depicts a block diagram illustrating a data quality management system in accordance with an illustrative embodiment.

FIG. 2 depicts a block diagram illustrating a data quality management system in accordance with an illustrative embodiment. Data quality management system 202 might be implemented in network data processing system 100 in FIG. 1.

In this illustrative example, the data quality management system 202 includes a rule engine 206 configured to identify a number of critical data points 218 in different software modules 216. Software modules 216 might comprise software components or parts of a program. In the present example, critical data points 218 may be predefined based on out-of-band data or in response to data incidents, e.g., if inconsistency is constantly found on a data point within the software modules 216, that particular data point may be predefined as a critical.

The critical data points 218 may be identified based on their priority ratings. Data points within software modules 216 are assigned priority ratings such as low, normal, and high. The data points may be assigned with priority rating that is subject to users' preference. By default, priority may be set to normal and lower and then upgraded as more is learned about their impact. In the present example, critical data points 218 are the data points that are assigned with higher priority ratings within the software modules 216.

Critical data points 218 can be related to company operations. Using the example of human resources (HR), critical data points might include employee hiring, employment termination, employment termination, employee transfer, position management, organizational changes, time off requests, benefits management, adding compensation, or payroll data.

Rule engine 206 is in communicated with a number of classifiers 208. In the present example, classifiers 208 are configured to detect, verify, and report inconsistencies of the critical data points 218. Each classifier 210 among classifiers 208 has a type 224 that is generalized and unique to target particular applications and can be applied to any suitable database user applications, e.g., HR application platforms, workflow applications, or payroll applications. Classifier 210 might pre-validate critical data points 218 by performing hierarchical tree traversal to ensure connectivity between resources. In some illustrative embodiment, the implementation of classifiers 208 and data quality management system 202 may be optimized to support applications of different scales.

Classifier type 224 might include duplication classifier, dangling foreign key classifier, cross domain classifier, histogram classifier, hierarchical tree classifier, knowledge based classifier, time continuation classifier, accuracy classifier, or format classifier. A duplication classifier detects duplicated rows in identified critical data points. A dangling foreign key classifier detects orphan objects, e.g., an active account with no associated users. A dangling foreign key classifier can be a rule-based classifier that defines primary and foreign keys. The dangling foreign key classifier periodically scans the data points in software modules 216 to highlight outliers. The dangling foreign key classifier can also be configured to review mutation of data over time by sampling timelines and detect schema table relationships by scanning data points in software modules 216.

A cross domain classifier that ensures consistency within the storage layer by synchronizing and comparing the stored data to make sure all data are up to date. For example, if a core HR associate (employee) has been terminated, the payroll domain also needs to be updated with the "terminated" status to avoid paying a person who is no longer an employee. A histogram classifier identifies the skewness of random data points, e.g., from data points related to email verification and identity. A reporting tree classifier ensures data quality of an organizational chart. A knowledge-based classifier verifies the existence and quality of the data supply to the computed function. For example, a state tax record is required in order to calculate paychecks for employees. As such, the classifiers have an out-of-band knowledge about predicates of a given task. A time continuation classifier ensures the continuation of, e.g., benefit coverage or datapoint descriptions of employee positions within the platform. An accuracy classifier verifies the data quality of an input for a calculation. A format classifier used to verify data format.

Classifier 210 from classifiers 208 can be configured to generalize data processing challenges and layouts in particular applications. For example, the hierarchy tree classifiers can be configured to attach the same processor code to different data points that have similarities to each other, such as, e.g., similarity in report structure or business unit.

Classifier 210 from classifiers 208 can be identified and bound to particular critical data points 218 based on the data type of the critical data points. For example, if the critical data points 218 relate to an input for a calculation, an accuracy classifier may be identified. As another example, if the critical data points 218 relates to an organizational chart, a reporting tree classifier may be identified instead. Classifiers 208 may be further configured to periodically scan the critical data points 218 for anomaly to verify an ability to correctly process the critical data points. In an illustrative embodiment, the scanning might identify continuity breaks in the data. When a continuity break is identified, the data quality management system 202 will trigger a correction procedure to fix such break. In some illustrative embodiments, the correction procedure may be performed by data owner manually, or by data quality management system 202 through automation. If classifier 210 does not find any continuity break, the data quality management system 202 will return a report indicates that the datapoints are trustworthy and ready for further data processing.

In this illustrative example, rule engine 206 may also include binding rules for binding classifiers 208 to database schemas. A rule may include a definition of a source table and column names, the classifier to attach, and additional schema elements as required. For example, in the case of dangling foreign keys, the rule may include a pointer to the primary key (table and column names). In this manner, adjusting a database connection and remapping the binding rules to a different database schema can achieve the same functionality.

Data quality management system 202 includes a user interface 220. In an illustrative embodiment, a data quality report 222 can be generated after the classifiers 208 scan the critical data points 218 and displayed in user interface 220, for example, to an end user or a software developer. In some illustrative embodiments, the data quality report 222 may present summarized information related to the critical data point 218. For example, data quality report 222 might present the amount of data inconsistence, outliers, or issues identified by each of classifiers 208, percentage of trusted data, and samples of most recent data inconsistence, outliers, or issues identified by classifiers 208.

In this illustrative example, the data quality report 222 may also include a decay index associated with a given table. The data quality management system 202 calculates the amount of data issues observed and the number of changes on the given table and returns a decay index by computing the number of issues or changes in the table. In an illustrative example, the data is not trustworthy if the decay index exceeds a specified threshold.

In some illustrative examples, the data quality management system 202 is also configured to identify missing code from the critical data points 218 in software module 216. For example, if a user is deleted, the data quality management system 202 will mark the deleted user's phone number as missing code because it cannot be associated to an existing user in the database. The deleted user's phone number can be kept in a system of record (SOR) timeline database, which captures all data mutation for auditing.

In some illustrative examples, the data quality management system 202 may also provide administrative backend access such as Create, Read, Update, and Delete (CRUD) pages access in cases of backend access break the data model.

The data quality management system 202 may be controlled by a metadata/DSL layer by supplying or adjusting the configurations in the data quality management system 202. The configuration has a format of text/JSON (JavaScript Object Notation) input. In an illustrative example, the classifiers 208 are not written for a given data model and respond to the configuration changes in the data quality management system 202.

In this illustrative example, data quality management system 202 can be implemented in software, hardware, firmware, or a combination thereof. When software is used, the operations performed by data quality management system 202 can be implemented in program code configured to run on hardware, such as a processor unit. When firmware is used, the operations performed by data quality management system 202 can be implemented in program code and data and stored in persistent memory to run on the processor unit. When hardware is employed, the hardware may include circuits that operate to perform the operations in data quality management system 202. For example, hardware can be implemented within a number of processors 212 or processes performed by data quality management system 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for data quality management system 202 can be located in computer system 200, which is a physical hardware system and includes one or more data processing systems. When more than one data processing system is present in computer system 200, those data processing systems are in communication with each other using a communications medium. The communications medium can be a network. The data processing systems can be selected from at least one of a computer, a server computer, a tablet computer, or some other suitable data processing system.

For example, data quality management system 202 can run on one or more processors 212 in computer system 200. As used herein a processor unit is a hardware device and is comprised of hardware circuits such as those on an integrated circuit that respond and process instructions and program code that operate a computer. When one or more processors 212 execute instructions for a process, one or more processors 212 that can be on the same computer or on different computers in computer system 200. In other words, the process can be distributed between processors 212 on the same or different computers in computer system 200. Further, one or more processors 212 can be of the same type or different type of processors 212. For example, one or more processors 212 can be selected from at least one of a single core processor, a dual-core processor, a multi-processor core, a general-purpose central processing unit (CPU), a graphics processing unit (GPU), a digital signal processor (DSP), or some other type of processor.

Figure 3:
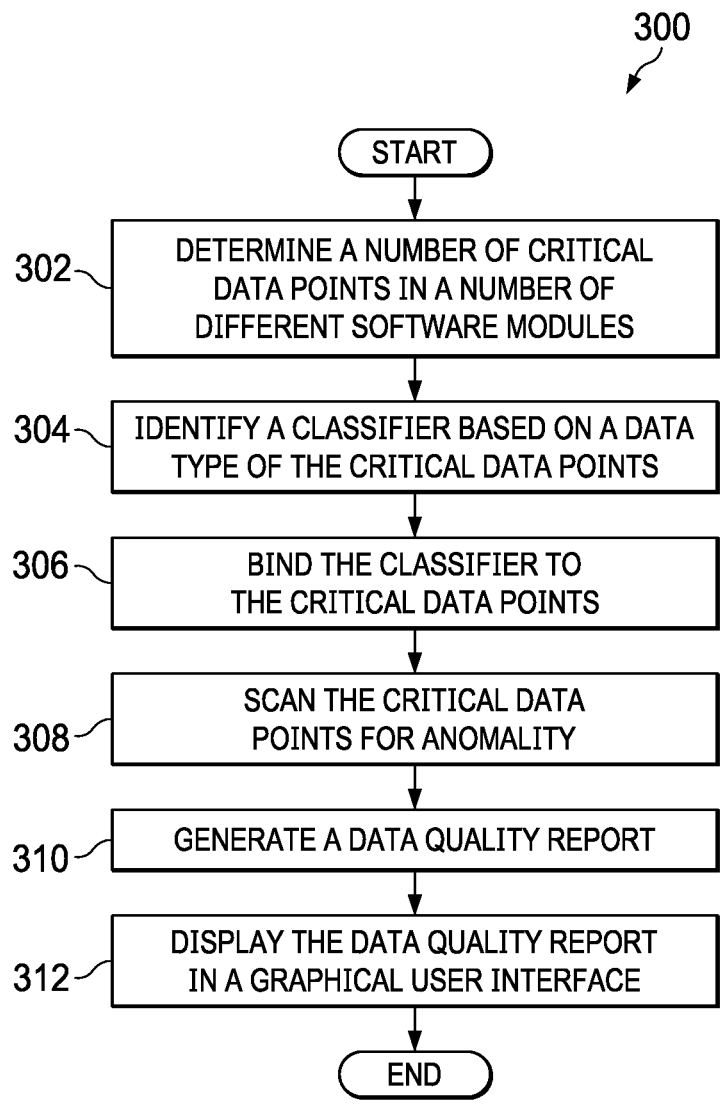
FIG. 3 depicts a flowchart illustrating a process for data quality management in accordance with an illustrative embodiment.

FIG. 3 depicts a flowchart illustrating a process for data quality management in accordance with an illustrative embodiment. Process 300 can be implemented in hardware, software, or both. When implemented in software, the process can take the form of program code that is run by one or more processor units located in one or more hardware devices in one or more systems. Process 300 might be implemented in the data quality management system 202 in FIG. 2.

Process 300 begins by determining a number of critical data points in a number of different software modules (Step 302). Within the field of HR, examples of critical data points might include employee hiring, employment termination, employee transfer, position management, organizational changes, time off requests, benefits management, adding compensation, and payroll data. The software modules may be program codes that are components or part of the program that make up a program.

Process 300 then identifies a classifier based on a data type of the determined critical data points (Step 304). The classifier may be a domain specific classifier. For example, the classifier might be specific to an HR domain such as payroll, benefits, hiring, etc. The classifier might be, e.g., a duplication classifier, dangling foreign key classifier, cross domain classifier, histogram classifier, reporting tree classifier, knowledge based classifier, time continuation classifier, accuracy classifier. or format classifier.

Process 300 binds the identified classifier to the critical data points (Step 306). In this illustrative example, binding of classifier to the critical data points can be achieved by any suitable method, for example, the binding can be done by first identify an input and an output of the critical data points and subsequently supply a transformation. Alternative, the binding of the classifier to the critical data points can also be achieved by machine learning mapping or static mapping.

Process 300 scans the critical data points for anomaly to verify an ability to process the critical data points (Step 308). Scanning the critical data points may comprise checking for inconsistencies in data points between the different software modules.

Process 300 then generate a data quality report (Step 310). As depicted above, the data quality reports summarize all relevant information gathered for the critical data points, for example, amount of data issues or inconsistence per classifier, percentage of trusted data in a table, and sample of most recent data issues. Process 300 display the data quality report in a graphical user interface (Step 312). Process 300 terminates thereafter.

Figure 4:
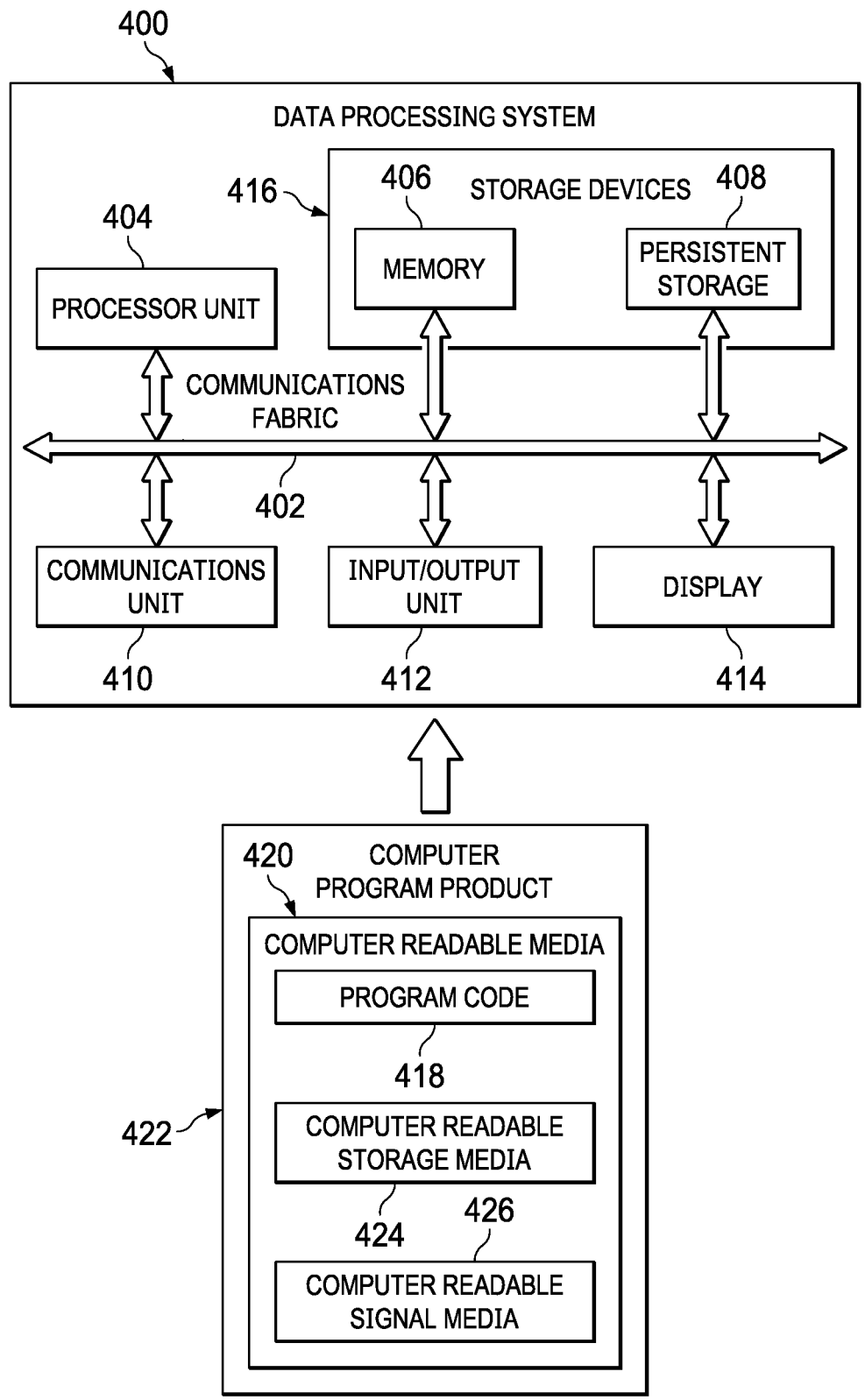
FIG. 4 is a block diagram of a data processing system in accordance with an illustrative embodiment.

Turning now to FIG. 4, an illustration of a block diagram of a data processing system is depicted in accordance with an illustrative embodiment. Data processing system 400 may be used to implement server computer 104 and server computer 106 and client devices 110 in FIG. 1, as well as computer system 200 in FIG. 2. In this illustrative example, data processing system 400 includes communications framework 402, which provides communications between processor unit 404, memory 406, persistent storage 408, communications unit 410, input/output unit 412, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation. In an embodiment, processor unit 404 comprises one or more conventional general-purpose central processing units (CPUs). In an alternate embodiment, processor unit 404 comprises one or more graphical processing units (CPUs).

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer-readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408. Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device.

Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer-usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these illustrative examples. In one example, computer-readable media 420 may be computer-readable storage media 424 or computer-readable signal media 426.

In these illustrative examples, computer-readable storage media 424 is a physical or tangible storage device used to store program code 418 rather than a medium that propagates or transmits program code 418. Computer readable storage media 424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 418 may be transferred to data processing system 400 using computer-readable signal media 426. Computer-readable signal media 426 may be, for example, a propagated data signal containing program code 418. For example, computer-readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for managing data quality, the method comprising:
   identifying, by one or more processors, a number of data points within a number of different software modules, each data point in the number of data points assigned with a priority, the priority indicating a first level of priority, a second level of priority, or a third level of priority;
   determining, by the one or more processors, a number of critical data points in the number of different software modules based on the priority of each data point in the number of data points;
   identifying, by the one or more processors, a classifier based on a data type of the critical data points, wherein the classifier is at least one of a dangling key classifier, a histogram classifier, a reporting tree classifier, an accuracy classifier, or a time continuation classifier;

binding, by the one or more processors, the classifier to the critical data points by: i) identifying an input associated with of the critical data points and an output associated with of the critical data points, and ii) supplying a transformation of the input and the output based on one or more binding rules that identify a source table and are configured to map the classifier to one or more schemas associated with the critical data points;

scanning, by the one or more processors, the critical data points bound to the classifier that supplies the transformation of the input and the output to identify one or more inconsistencies between the different software modules and the input or the output associated with the critical data points;

generating, by the one or more processors, a data quality report that indicates a level of impact to an operation performed by the number of different software modules, the level of impact determined based on the one or more inconsistencies in the critical data points between the different software modules and the priority assigned to each data point in the number of data points; and displaying, by the one or more processors, the data quality report to an end user in a graphical user interface.

2. The method of claim 1, wherein scanning the critical data points comprises checking for inconsistencies in the data points between the different software modules.

3. The method of claim 1, wherein the classifier is a domain specific classifier.

4. The method of claim 3, wherein the domain specific classifier is selected from at least one of:
duplication classifier;
cross domain classifier;
knowledge based classifier; or
format classifier.

5. The method of claim 1, wherein the reporting tree classifier pre- validates the critical data points by performing tree traversal to ensure connectivity between resources.

6. The method of claim 1, wherein binding the classifier to the critical data points comprises machine learning mapping.

7. The method of claim 1, wherein binding the classifier to the critical data points comprises static mapping.

8. The method of claim 1, wherein the critical data points relate to at least one of:
employee hiring;
employment termination;
employee transfer;
position management;
organizational changes;
time off requests;
benefits management;
adding compensation; or
payroll data.

9. A system for managing data quality, the system comprising:
a storage device configured to store program instructions; and
one or more processors operably connected to the storage device and configured to execute the program instructions to cause the system to:
identify a number of data points within a number of different software modules, each data point in the number of data points assigned with a priority, the priority indicating a first level of priority, a second level of priority, or a third level of priority;

determine a number of critical data points in the number of different software modules based on the priority of each data point in the number of data points;

identify, a classifier based on a data type of the critical data points, wherein the classifier is at least one of a dangling key classifier, a histogram classifier, a reporting tree classifier, an accuracy classifier, or a time continuation classifier;

bind the classifier to the critical data points by: i) identifying an input associated with of the critical data points and an output associated with of the critical data points, and ii) supplying a transformation of the input and the output based on one or more binding rules that identify a source table and are configured to map the classifier to one or more schemas associated with the critical data points;

scan the critical data points bound to the classifier that supplies the transformation of the input and the output to identify one or more inconsistencies between the different software modules and the input or the output associated with the critical data points;

generate a data quality report that indicates a level of impact to an operation performed by the number of different software modules, the level of impact determined based on the one or more inconsistencies in the critical data points between the different software modules and the priority assigned to each data point in the number of data points; and display the data quality report to an end user in a graphical user interface.

10. The system of claim 9, wherein scanning the critical data points comprises checking for inconsistencies in the data points between the different software modules.

11. The system of claim 9, wherein the classifier is a domain specific classifier.

12. The system of claim 11, wherein the domain specific classifier is selected from at least one of:
duplication classifier;
cross domain classifier;
knowledge based classifier; or
format classifier.

13. The system of claim 9, wherein the reporting tree classifier pre- validates the critical data points by performing tree traversal to ensure connectivity between resources.

14. The system of claim 9, wherein binding the classifier to the critical data points comprises machine learning mapping.

15. The system of claim 9, wherein binding the classifier to the critical data points comprises static mapping.

16. The system of claim 9, wherein the critical data points relate to at least one of:
employee hiring;
employment termination;
employee transfer;
position management;
organizational changes;
time off requests;
benefits management;
adding compensation; or
payroll data.

17. A computer program product for managing data quality, the computer program product comprising:
a computer-readable storage medium having program instructions embodied thereon to perform the steps of:

identifying a number of data points within a number of different software modules, each data point in the number of data points assigned with a priority, the priority indicating a first level of priority, a second level of priority, or a third level of priority;

determining a number of critical data points in the number of different software modules based on the priority of each data point in the number of data points;

identifying a classifier based on a data type of the critical data points, wherein the classifier is at least one of a dangling key classifier, a histogram classifier, a reporting tree classifier, an accuracy classifier, or a time continuation classifier;

binding the classifier to the critical data points by: i) identifying an input associated with of the critical data points and an output associated with of the critical data points, and ii) supplying a transformation of the input and the output based on one or more binding rules that identify a source table and are configured to map the classifier to one or more schemas associated with the critical data points;

scanning the critical data points bound to the classifier that supplies the transformation of the input and the output to identify one or more inconsistencies the different software modules and the input or the output associated with the critical data points;

generating a data quality report that indicates a level of impact to an operation performed by the number of different software modules, the level of impact determined based on the one or more inconsistencies in the critical data points between the different software modules and the priority assigned to each data point in the number of data points; and displaying the data quality report to an end user in a graphical user interface.

18. The computer program product of claim 17, wherein scanning the critical data points comprises checking for inconsistencies in the data points between the different software modules.

19. The computer program product of claim 17, wherein the classifier is a domain specific classifier.

20. The computer program product of claim 19, wherein the domain specific classifier is selected from at least one of:
   duplication classifier;
   cross domain classifier;
   knowledge based classifier; or
   format classifier.

21. The computer program product of claim 17, wherein the reporting tree classifier pre-validates the critical data points by performing tree traversal to ensure connectivity between resources.

22. The computer program product of claim 17, wherein binding the classifier to the critical data points comprises machine learning mapping.

23. The computer program product of claim 17, wherein binding the classifier to the critical data points comprises static mapping.

24. The computer program product of claim 17, wherein the critical data points relate to at least one of:
   employee hiring;
   employment termination;
   employee transfer;
   position management;
   organizational changes;
   time off requests;
   benefits management;
   adding compensation; or
   payroll data.

* * * * *